United States Patent [19]

Burnham et al.

[11] 4,203,353
[45] May 20, 1980

[54] PISTON MEANS FOR PISTON-CYLINDER ARRANGEMENTS

[75] Inventors: Jack Burnham, Melksham; Jack Washbourn, London, both of England

[73] Assignees: Avon Industrial Polymers Limited, Melksham; Westinghouse Brake & Signal Co. Ltd., London, both of England

[21] Appl. No.: 834,441

[22] Filed: Sep. 19, 1977

[30] Foreign Application Priority Data

Sep. 24, 1976 [GB] United Kingdom ............... 39681/76

[51] Int. Cl.² ........................... F01B 31/10; F16J 9/08
[52] U.S. Cl. ........................................ 92/159; 92/160; 92/240; 92/250
[58] Field of Search ................. 92/160, 159, 249, 250, 92/251, 252, 253, 254, 158, 240–246

[56] References Cited

U.S. PATENT DOCUMENTS

| | | | |
|---|---|---|---|
| 1,774,967 | 9/1930 | Ellis | 92/160 |
| 2,194,732 | 3/1940 | Aikmon | 92/159 |
| 2,201,571 | 5/1940 | Aikmon | 92/159 |
| 2,211,456 | 8/1940 | Caldwell | 92/159 |
| 2,428,452 | 10/1947 | Former | 92/159 |
| 2,840,428 | 6/1958 | Browell | 92/159 |

Primary Examiner—Paul E. Maslousky
Attorney, Agent, or Firm—Larson, Taylor and Hinds

[57] ABSTRACT

A piston-cylinder arrangement comprising a cylinder member and piston means mounted slideably therein, the piston means comprising a piston member and a packing member mounted on the piston member for movement therewith, wherein said packing member has first and second axially spaced radially outer surfaces dimensioned such that each contacts slidingly against said cylinder wall and wherein the piston means comprises a lubricant reservoir in communication with the space between said surfaces, which space is substantially closed by said cylinder wall.

7 Claims, 8 Drawing Figures

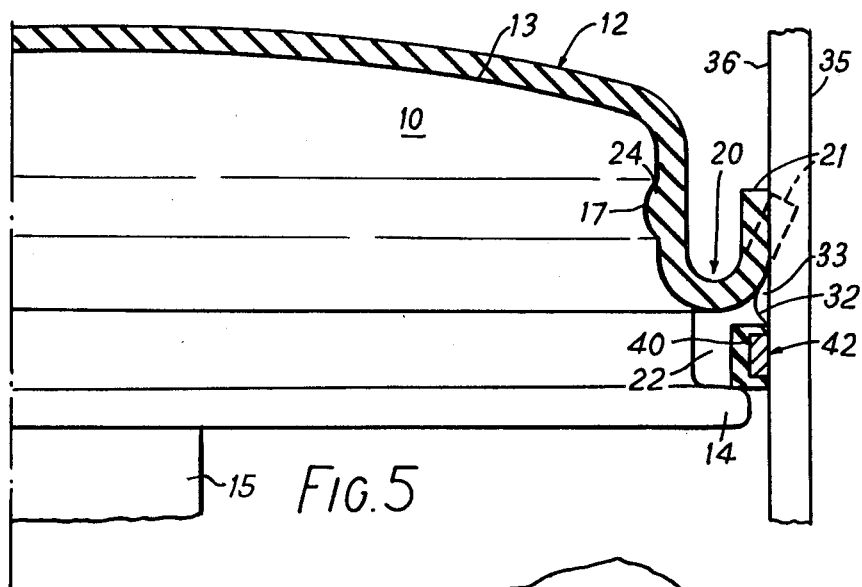
FIG.5
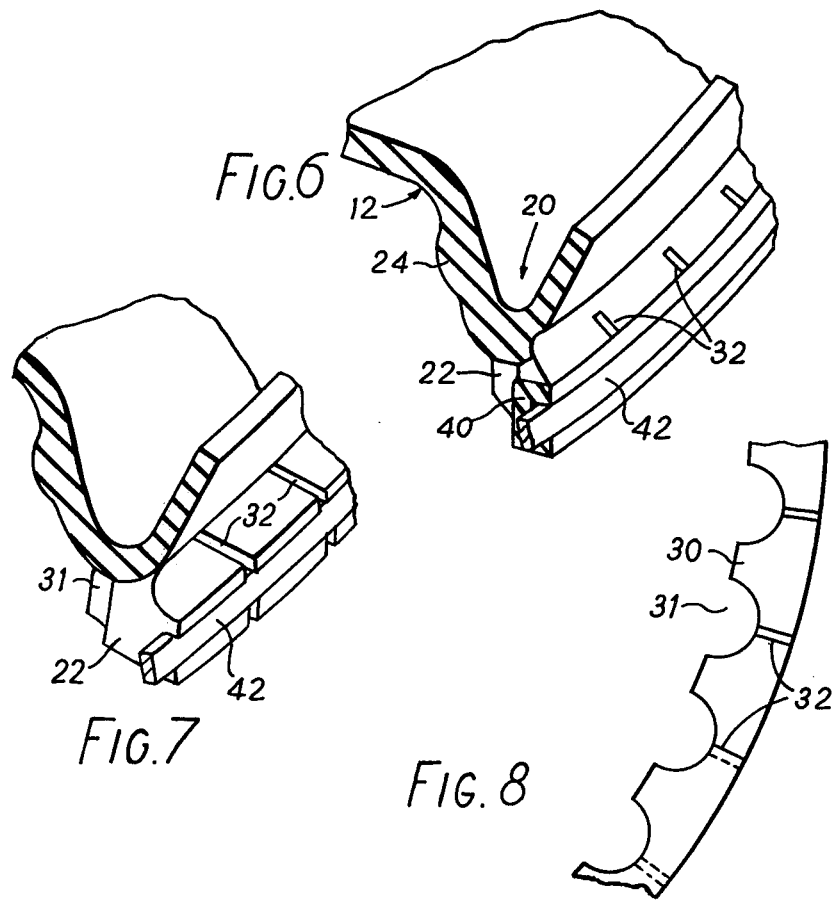
FIG.6
FIG.7
FIG.8

PISTON MEANS FOR PISTON-CYLINDER ARRANGEMENTS

This invention relates to piston means for piston-cylinder arrangements, particularly but not exclusively for pneumatic pressure operable, single acting piston-cylinder arrangements that for example are used for the application of the brakes of a railway vehicle (in which art such arrangements are known as "brake cylinders").

The piston means described in U.S. Pat. No. 3,183,795 comprises a piston member retaining a packing member to provide a sliding seal between the piston member and the cylinder member of the piston-cylinder arrangement, the piston member having an outer diameter less than the inner diameter of the cylinder member to provide therebetween an annular gap in which a separate ring is disposed to prevent the piston member engaging or "hammering" against the wall of the cylinder member. Lubrication of the latter is provided by a sprayed-on coating of a semi-permanent lubricant such as molybdenum disulphide.

The piston means described in U.K. Patent specification No. 752324 comprises a piston member retaining a packing member to provide a sliding seal between the piston member and the cylinder member of the piston-cylinder arrangement, the packing member being provided with at least one continuous peripheral grease groove to retain lubricant which, it is said, is pressed out of the groove(s) onto the wall of the cylinder member when pneumatic pressure is applied to the pressure face of the piston means, and is sucked back into the groove from off the wall of the cylinder member when the said pneumatic pressure is relieved.

It is considered desirable to provide piston means which can avoid "hammering" and/or by which any such distribution and/or recovery of lubricant might be improved, and/or whereby the piston means may comprise a minimal number of parts to reduce the costs of manufacture, assembly and stock-keeping.

According to one aspect of this invention there is provided piston means for slideable mounting in a cylinder member to form therewith a piston-cylinder arrangement, the piston means comprising a packing member mounted on a piston member for movement therewith, the packing member comprising first and second radially outer surfaces axially separated by a recess, characterised in that the first and second outer surfaces are both dimensioned such that, in use, each contacts slidingly against the inner surface of a said cylinder member and said inner surface will provide an outer closure for the recess, and further characterised in that a reservoir for lubricant is provided in the piston means in communication with the recess in the packing member.

Preferably the packing member comprises a lip portion to provide a sliding seal between the piston member and the inner surface of a said cylinder member, and is characterised in that the radially outer surface of the lip portion constitutes said first outer surface of the packing member, in that the lip portion is formed as an integral unit with a ring portion in axially spaced relation to provide said recess, and in that the ring portion has a diameter greater than the maximum diameter of the piston member for preventing "hammering" of the piston means when in a said cylinder member.

The ring portion may have a peripheral recess accommodating a wear ring of which the radially outer surface constitutes said second outer surface of the packing member, or (as is preferred) the ring portion may itself constitute a wear ring with its radially outer surface constituting the said second outer surface of the packing member. Preferably, in either case, the ring portion has a surface adjacent the lip portion and directed transversely to the radially outer surface of the ring portion, these two surfaces meeting at an acute angle to form a scraper ring for lubricant recovery.

Preferably the reservoir is formed in the ring member. Advantageously the reservoir may comprise a plurality of spaced apart individual cavities within the ring member (preferably equi-angularly spaced apart), each cavity having an opening to the recess. Preferably the reservoir contains grease or other lubricant.

According to another aspect of this invention there is provided a piston-cylinder arrangement (e.g. a pneumatically operable, single acting, so-called brake cylinder) comprising a cylinder member on which there is slideably mounted piston means according to said one aspect of this invention.

By way of example, embodiments of this invention will now be described with reference to the accompanying drawings of which:

FIG. 5 is a sketch showing a part cross-section through a second embodiment of this invention;

FIG. 6 is a perspective cross-sectioned view of part of the packing member shown in FIG. 5;

FIG. 7 is a perspective cross-sectioned view of part of the packing member of a third embodiment of this invention; and FIG. 8 is an underplan view of part of the packing member of FIG. 7.

Figure 1:
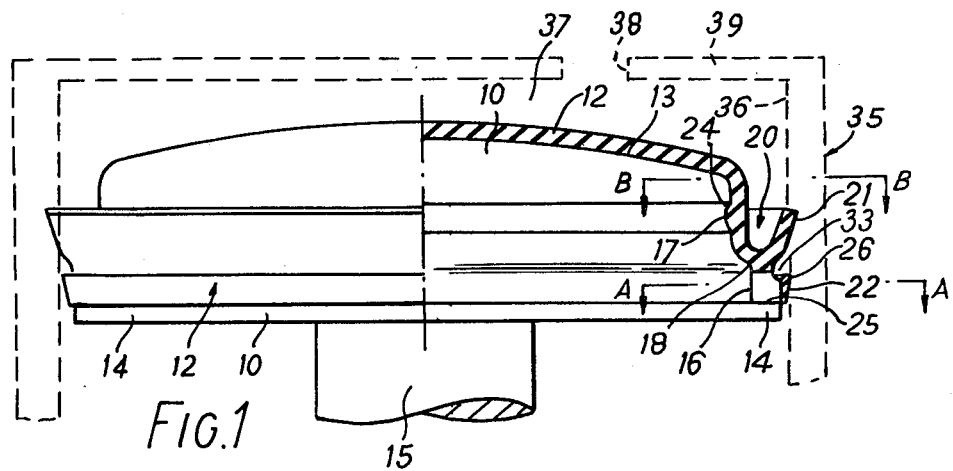
FIG. 1 is a partly sectioned side view of a first embodiment of this invention.

Referring to FIGS. 1 to 4, the piston means shown in FIG. 1 comprises a piston member 10 and an integrated packing member and ring member 12 mounted thereon. The piston member 10 has a domed front face 13 and at its rear a peripheral laterally directed flange 14 from which a piston rod 15 extends rearwardly. Between the face 13 and flange 14, the piston member 10 is provided with a shaped side surface 16 including a concave recess 17 and a nose 18. The integrated packing member and ring member 12 is a single unitary moulding of natural or synthetic rubber or of plastics material and comprises a packing member 20 that is generally cup-shaped and provided with an oppositely directed lip portion 21, and a ring member 22 extending from the region 23 where the lip portion 21 joins the remainder of the packing member 20. The internal surface of the packing member is provided with a thickened convex projection 24 to be a snap fit within the concave recess 17 of the piston member, such interfitting of these two components serving to mount the integrated component 12 on the piston member 10 for movement therewith. The nose 18 of the piston member 10 mates with the correspondingly shaped internal surface of the component 12 adjacent the region 23. The rearward end surface 25 of the ring member 22 abuts against the flange 14 of the piston member which has a diameter less than the minimum diameter of the tapered peripheral outer surface 26 of the ring member 22.

Figure 2:
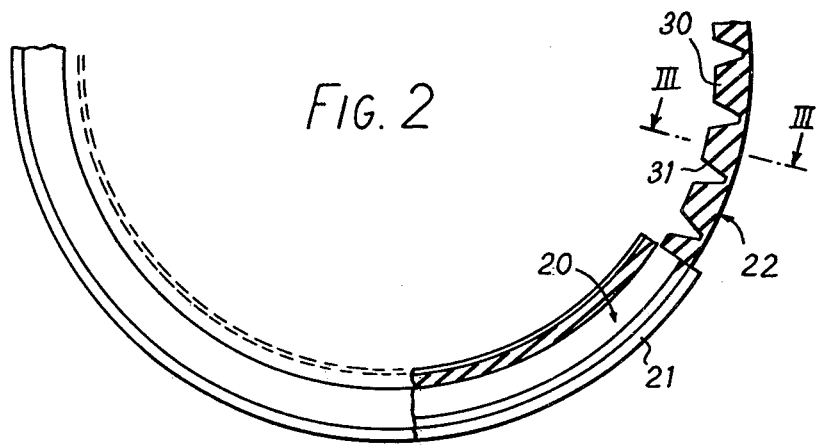
FIG. 2 is a plan view of the piston means of FIG. 1 partly sectioned along the line A—A and the line B—B of FIG. 1.
Figure 3:
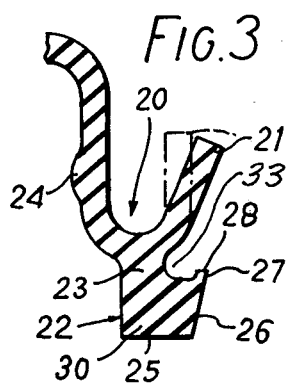
FIG. 3 is a cross-sectional view along the line III—III of FIG. 2.
Figure 4:
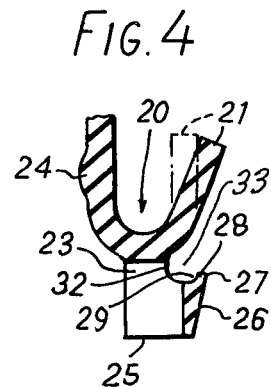
FIG. 4 is an enlarged view of part of FIG. 1.

The diameter of the ring member's peripheral outer surface 26 increases linearly as the surface approaches the lip portion 21, and forms an acute angle at 27 with an adjoining radial surface 28 of the ring member (see FIG. 3). Conveniently this acute angle, when the ring member 22 is unstressed, is about 77½ degrees of arc. The surfaces 26 and 28 which meet at the acute-angled arris 27 form a forwardly projecting wall portion 29 of the ring member. The ring member 22 has a solid annulus 30 formed with a number (e.g. 36) of equi-angularly spaced cavities 31 that, as shown in FIG. 2, are each of generally triangular cross-section. Conveniently the included angled of each triangular cross-section is 45 degrees of arc. Each of the cavities 31 communicates via an associated opening 32 with the continuous annular space 33 between the lip portion 21 and the projecting wall portion 29 of the ring member 22.

When the piston means is slidingly inserted into a cylinder member 35 therefor (illustrated in broken outline in FIG. 1), the lip portion 21 of the packing member 20 deflects through about 22½ degrees of arc to make sliding contact along its length with the internal surface 36 of the cylinder member 35, and the ring member 22 is compressed so that its peripheral outer surface 26, which is tapered in the unstressed state, also makes sliding contact along its length with the internal surface 36 of the cylinder member 35 and deflects the surface 28 to be acutely inclined thereto. Prior to such insertion of the piston means, the cavities 31 are all packed with grease or other suitable lubricant. When, in use, compressed air is supplied to the cylinder chamber 37 via a port 38 in an end wall 39 of the cylinder member 35, the piston means is moved away from the end wall 39 against the action of a coiled compression spring (not shown) encompassing the piston rod 15 and acting against the rearward face of the piston member 10. In executing such movement, the lip portion 21 is urged by the pneumatic pressure into tight sealing yet sliding engagement of the cylinder surface 36, and there is a strong tendency for the lubricant in the cavities 31 to emerge therefrom through the opening 32 into the space 33 and contact the cylinder surface 36 to lubricate it with a layer of the lubricant. As indicated in the drawings, lip portion 21 is substantially more compressible than ring member 22. When the pneumatic pressure is relieved, the coiled compression spring returns the piston means to its rest position adjacent end wall 39 and in executing this return motion the projecting wall portion 29 of the ring member 22 acts as a scraper ring and tends to scrape the lubricant layer off the surface 36 by the action of arris 27 and surface 28 with a view to its being returned to the cavities 31 through the openings 32. In other words, positive lubricant recovery can be achieved. It will be noted that the space 33 is substantially closed by the lip portion 21 and the wall portion 29.

It will be appreciated that even in the compressed state of its sliding fit in the cylinder member 35, the diameter of surface 26 (which equals the diameter of surface 36) is greater than the diameter of flange 14. The resiliency of the ring member 22 is arranged such that it cannot be so compressed by the weight of the piston member or vibration of the latter as to enable the piston member to contact directly the cylinder wall surface 36. Thus "hammering" is avoided, and the ring member 22 serves as a wear ring.

It will be apparent that the embodiment of FIGS. 1-4, provides piston means for slideable mounting in a cylinder member to form therewith a piston-cylinder arrangement, the piston means comprising a piston member, a packing member mounted on the piston member for movement therewith and having a lip portion to provide a sliding seal between the piston member and a cylinder member of a said arrangement, a ring member for sliding contact of the cylinder member and to prevent direct engagement of the piston member against the said cylinder member, the ring member being integral and unitary with the packing member and having an outer wall portion axially spaced from the lip portion which space is in communication with a reservoir for lubricant formed in the ring member. In this embodiment, said outer wall portion has two defining surfaces thereof adjacent the lip portion mutually inclined and meeting at an acute angle to form the outer wall portion as a scraper ring for lubricant recovery.

In a modification of the embodiment of FIGS. 1 to 4, the flange 14 is omitted, so that the ring member 22 encompasses the piston member 10 about the latter's maximum diameter. Optionally in this case, the cavities 31 may be closed rearwardly of the piston means by base portions moulded integrally with the ring member (and the packing member).

The embodiment of FIGS. 5 and 6 is similar to that of FIGS. 1 to 4 and like parts have been given like numerals. The embodiment of FIGS. 5 and 6 differ in that the outer surface 26 of the ring member 22 is recessed at 40 and accommodates a separate wear ring 42 which may be of a different material to that of the ring member 22. The openings 32 are in the form of slots and lead to cavities 31 of semi-circular cross-section as shown in FIG. 8.

The embodiment of FIG. 7 is similar to that of FIGS. 5 and 6, but differs therefrom in that the slot-like openings 32 extend longitudinally through the ring member 22.

In each of these two embodiments of FIGS. 5 to 8, the ring member 22 is arranged to have such resiliency as to prevent direct contact between the piston member 10 and the cylinder member's internal surface 36. As before, the flange 14 may be omitted so that the ring member 22 encompasses the piston member about its maximum diameter.

Either or each of the two embodiments of FIGS. 5 to 8 may be modified by providing the ring member 22 with surfaces such as 26 and 28 of the embodiment of FIGS. 1 to 4 that are mutually inclined and form a scraper ring for lubricant recovery.

It will be apparent that each of the embodiments of FIGS. 5 to 8 provides piston means for slideable mounting in a cylinder member to form therewith a piston-cylinder arrangement, the piston means comprising a piston member, a packing member mounted on the piston member for movement therewith and having a lip portion to provide a sliding seal between the piston member and a cylinder member of a said arrangement, a ring member having an outer wall portion axially spaced from the lip portion and of a diameter greater than the maximum diameter of the piston member substantially to close the space between the lip portion and the outer wall portion, the ring member being integral and unitary with the packing member and being formed with a reservoir for lubricant in communication with said space. Also the outer wall portion is provided with a peripheral recess to accommodate a wear ring for sliding contact of the cylinder member.

It will also be apparent that in each of the embodiments of FIGS. 1 to 8, the reservoir is provided by a plurality of equi-angularly spaced apart cavities within the ring member, each cavity having an opening whereby it is to communicate with said space. Conveniently the reservoir contains grease or other lubricant. Also, in each said embodiment, the packing member and ring member are moulded integrally with one another of a natural of synthetic rubber or plastics material.

Having thus described our invention what we claim is:

1. A piston-cylinder arrangement comprising a cylinder member and piston means mounted slideably therein, the piston means comprising a piston member and a packing member including first and second axially spaced radially outer surfaces dimensioned such that each contacts slidingly against the wall of said cylinder, the piston means comprising a lubricant reservoir in communication with the space between said surfaces, said space being substantially closed by said cylinder wall and the packing member further comprising a ring portion the radially outer surface of which constitutes said second outer surface and which has a diameter greater than the maximum diameter of the piston member to prevent "hammering" of the piston means in the cylinder member, and further comprising a lip portion having a radially outer surface constituting said first outer surface, the lip portion and ring portion being formed as a unit integral with one another in axially spaced relation such that the radially outer surface of the lip portion cooperates with an opposed space defining surface of said ring portion to define said space, the space defining surface of the ring portion and the radially outer surface of the ring portion forming an acute angle and a single scraper ring for lubricant recovery being formed on the outermost edge of the space defining surface of the ring portion, said lip portion extending in a direction away from said scraper ring.

2. A piston-cylinder arrangement comprising a cylinder member and piston means mounted slideably therein, the piston means comprising a piston member and a packing member mounted on the piston member for movement therewith, said packing member including first and second axially spaced radially outer surfaces dimensioned such that each contacts slidingly against the wall of said cylinder, said packing member comprising a packing ring portion having a diameter greater than the maximum diameter of the piston member for preventing "hammering" of the piston means in the cylinder member, said ring portion defining a lubricant reservoir between the innermost surface thereof and the adjacent outer surface of the piston member and in communication with a space between said surfaces, said space being substantially closed by said cylinder wall, and said lubricant reservoir comprising a plurality of angularly spaced cavities each having an opening to said space, the radially outer surface of said ring portion constituting said second outer surface.

3. A piston-cylinder arrangement according to claim 2, wherein the radially outer surface of said ring portion constitutes said second outer surface of the packing member such that the ring portion constitutes a wear ring.

4. A piston-cylinder arrangement comprising a cylinder member and piston means mounted slideably therein, the piston means comprising a piston member and a packing member mounted on the piston member for movement therewith, said packing member including first and second axially spaced radially outer surfaces dimensioned such that each contacts slidingly against the wall of said cylinder, said first and second surfaces defining a space therebetween and the piston means comprising a lubricant reservoir in communication with the space between said surfaces, said space being substantially closed by said cylinder wall, and the packing member further comprising a ring portion the radially outer surface of which constitutes said second outer surface and which has a diameter greater than the maximum diameter of the piston member to prevent "hammering" of the piston means in the cylinder member, and further comprising a lip portion having a radially outer surface constituting said first outer surface, the lip portion and ring portion being formed as a unit integral with one another in axially spaced relation such that the radially outer surface of the lip portion cooperates with an opposed space defining surface of said ring portion to define said space, said lubricant reservoir comprising a plurality of angularly spaced cavities located in the said ring portion, each cavity having an opening to said space.

5. A piston-cylinder arrangement according to claim 4, wherein the space defining surface of the ring portion and the radially outer surface of the ring portion meet at an acute angle to provide a scraper ring for lubricant recovery.

6. A piston-cylinder arrangement comprising cylinder means and piston means mounted slideably therein, the piston means comprising: a piston member; a packing member mounted on the piston member for movement therewith and having a lip portion providing a sliding seal between the piston member and the cylinder means; a ring member in sliding contact with the cylinder means and constructed and arranged so as to prevent "hammering" of the piston means in the cylinder member, the ring member being integral and unitary with the packing member and axially spaced from the lip portion; the piston means further comprising a reservoir for lubricant in communication with the space between the lip portion and ring member, said reservoir being formed in the ring member and said lip portion being substantially more compressible than said ring member.

7. A piston-cylinder arrangement according to claim 6, wherein the ring member has a surface adjacent the lip portion and directed transversely to the surface of the ring member in sliding contact with the cylinder means, these two surfaces meeting at an acute angle to form a scraper ring for lubricant recovery.

* * * * *